(12) United States Patent
Pence et al.

(10) Patent No.: US 7,584,147 B2
(45) Date of Patent: Sep. 1, 2009

(54) SYSTEM FOR IDENTIFYING AN INDIVIDUAL AND MANAGING AN ACCOUNT

(76) Inventors: Joseph A. Pence, 12053 Leighton Ct., Carmel, IN (US) 46032; Brad A. Benge, 10609 E. County Rd. 200 S., Indianapolis, IN (US) 46231; Spencer M. Zimmerman, 33 Druid Hill Ct., Carmel, IN (US) 46032

(*) Notice: Subject to any disclaimer, the term of this patent is extended or adjusted under 35 U.S.C. 154(b) by 25 days.

(21) Appl. No.: 11/851,895

(22) Filed: Sep. 7, 2007

(65) Prior Publication Data

US 2009/0070261 A1 Mar. 12, 2009

(51) Int. Cl.
*G06Q 40/00* (2006.01)

(52) U.S. Cl. .................. 705/44; 705/35; 705/39; 705/72; 726/3

(58) Field of Classification Search .............. 705/39, 705/72, 44; 726/3; 340/5.8; 713/201
See application file for complete search history.

(56) References Cited

U.S. PATENT DOCUMENTS

| | | | |
|---|---|---|---|
| 5,274,695 A | 12/1993 | Green | |
| 5,483,581 A | 1/1996 | Hird et al. | |
| 5,617,471 A | 4/1997 | Rogers et al. | |
| 5,894,511 A | 4/1999 | Jordan | |
| 6,282,276 B1 | 8/2001 | Felger | |
| 6,493,437 B1 | 12/2002 | Olshansky | |
| 6,928,154 B1 | 8/2005 | Cheaito et al. | |
| 6,954,520 B1 | 10/2005 | Lang et al. | |
| 6,996,220 B2 | 2/2006 | Kowalski | |
| 7,142,653 B2 | 11/2006 | Creamer et al. | |
| 7,164,757 B2 | 1/2007 | Link | |
| 7,170,982 B2 | 1/2007 | Li et al. | |
| 7,181,200 B2 | 2/2007 | Malackowski et al. | |
| 2002/0015485 A1 | 2/2002 | Bhusri | |
| 2003/0002476 A1 | 1/2003 | Chung et al. | |
| 2003/0038707 A1* | 2/2003 | Geller | 340/5.8 |
| 2003/0059023 A1 | 3/2003 | Crockett et al. | |
| 2003/0112952 A1 | 6/2003 | Brown et al. | |
| 2003/0115203 A1 | 6/2003 | Brown et al. | |
| 2004/0202298 A1 | 10/2004 | Lopez et al. | |
| 2004/0213202 A1 | 10/2004 | Funatsu | |
| 2004/0243518 A1* | 12/2004 | Clifton et al. | 705/72 |
| 2005/0120249 A1* | 6/2005 | Shuster | 713/201 |
| 2005/0163296 A1 | 7/2005 | Smith et al. | |

(Continued)

FOREIGN PATENT DOCUMENTS

JP 6105021 4/1994

(Continued)

*Primary Examiner*—Ella Colbert
*Assistant Examiner*—Samica L Norman
(74) *Attorney, Agent, or Firm*—Woodard, Emhardt, Moriarty, McNett & Henry LLP (57) ABSTRACT

The present invention provides a method for managing an account for an unidentified individual by communicating with the unidentified individual who is using a device to communicate which transmits an identifier associated with the origin of the communication, obtaining from the unidentified individual a group of characters associated with the unidentified individual's personal information, comparing the group of characters to a database including a plurality of personal information associated with a plurality of individuals, identifying from the plurality of individuals one individual whose plurality of personal information includes the group of characters associated with the unidentified individual, and managing an account for the identified individual in an account database.

16 Claims, 5 Drawing Sheets

U.S. PATENT DOCUMENTS

| | | |
|---|---|---|
| 2005/0180403 A1 | 8/2005 | Haddad et al. |
| 2005/0180404 A1 | 8/2005 | Kwon |
| 2005/0232246 A1 | 10/2005 | Dowling |
| 2006/0034440 A1 | 2/2006 | Creamer et al. |
| 2006/0120345 A1 | 6/2006 | Sung et al. |
| 2006/0147019 A1 | 7/2006 | Veschi |
| 2006/0159063 A1 | 7/2006 | Kumar |
| 2006/0285667 A1 | 12/2006 | Hodge |
| 2007/0022049 A1* | 1/2007 | Diveley et al. ............ 705/39 |
| 2007/0022469 A1* | 1/2007 | Cooper et al. ............ 726/3 |
| 2007/0047519 A1 | 3/2007 | Bangor et al. |

FOREIGN PATENT DOCUMENTS

| | | |
|---|---|---|
| JP | 6303342 | 10/1994 |
| JP | 7297956 | 1/1995 |
| WO | WO9724863 | 7/1994 |

* cited by examiner

SYSTEM FOR IDENTIFYING AN INDIVIDUAL AND MANAGING AN ACCOUNT

FIELD OF THE INVENTION

The present invention relates generally to identity verification systems and more particularly to identity verification systems associated with user account management.

BACKGROUND

Generally consumers who wish to purchase merchandise or services on credit must present one of several kinds of credit cards. For persons who have poor credit and therefore are unable to obtain a credit card or for persons who do not wish to have credit cards issued in their names, purchasing products or services is inconvenient and in some cases impossible. The problem is even greater when a consumer wishes to purchase a product remotely, e.g. online, and must use credit cards which the remote vendors accept. Even if the consumer has a particular type of credit card, that particular credit card may not be accepted by the remote vendor. In numerous circumstances, e.g. when a credit card company has raised their rates, vendors stop accepting that credit card. The only choice the consumer has in such a circumstance is to purchase using another credit card. Therefore, even having a credit card issued to a consumer does not alleviate issues related to purchasing products or services remotely.

Also, local vendors (e.g. restaurants) may as a policy not take credit cards. Inconvenience can elevate to embarrassment when the consumer, after having consumed a product, is informed by the vendor they only accept cash and the consumer has no cash to pay for the consumed product.

In cases where the vendors are willing to let the consumer obtain a new credit card account at the time of purchase of products or services and where the charges for the desired products or services are to be billed to the newly created credit card, consumers are often frustrated at the amount of time it takes to complete the required process. Additionally, a large number of security-sensitive questions are asked requiring the consumer to respond to these questions in public.

The reason for the requirement to acquire a large variety of personal information is to prevent unauthorized credit account creation. For example, creating a new credit card account would be easier if all a system required of the consumer was the consumer's social security number. However, social security numbers of consumers are often stolen in what is known as identity theft. Therefore, convenience of providing a small amount of data, e.g. social security number alone, is not practical when creating a new credit account.

Yet another frustrating situation is where the consumer wishes to obtain a remote service such as make a collect call to a recipient having a nontraditional telephone number. For example, an incarcerated person who in most cases has no access to a credit card cannot make a collect call to a cellular telephone, voice over IP (hereinafter VOIP), e.g. cable line phone, etc., since there is currently no way for the telephone companies to charge the recipient of the call with the collect call bill.

In some or all of the above situations a consistent obstacle is that of verifying identity of the unidentified individual. That is, a newly created credit account based on the information an unidentified person has provided is only as accurate as the information provided by that individual. If the unidentified individual has stolen a series of personal information from another person, the unidentified individual may be able to create a new credit account and falsely charge against that account. Only after the rightful owner of the personal information is made aware of the charges, will this identity theft situation become clear. This situation has plagued the credit card industry.

There is therefore a need for a third party system which by obtaining a small amount of personal information from an unidentified person communicating remotely using a communications device is capable of quickly checking and verifying the identity of that person, creating a new account or update an existing account for that person, and to extend credit on behalf of that person.

SUMMARY OF THE INVENTION

A method is provided for managing an account for an unidentified individual by communicating with the unidentified individual who is using a device to communicate which transmits an identifier associated with the origin of the communication, obtaining from the unidentified individual a group of characters associated with the unidentified individual's personal information, comparing the group of characters to a database including a plurality of personal information associated with a plurality of individuals, and identifying from the plurality of individuals one individual whose personal information includes the group of characters associated with the unidentified individual, and managing an account of the identified individual in an account database.

In one form of the invention, the group of characters includes no more than 11 digits consisting of the last four digits of the social security number associated with the unidentified individual, the last two digits of the year of birth associated with the unidentified individual, and the postal zip code associated with the residence of the unidentified individual.

In certain embodiments, managing an account comprises extending credit to a third party on behalf of the identified individual

BRIEF DESCRIPTION OF DRAWINGS

The above-mentioned and other advantages of the present invention and the manner of obtaining them, will become more apparent and the invention itself will be better understood by reference to the following description of the embodiments of the invention taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
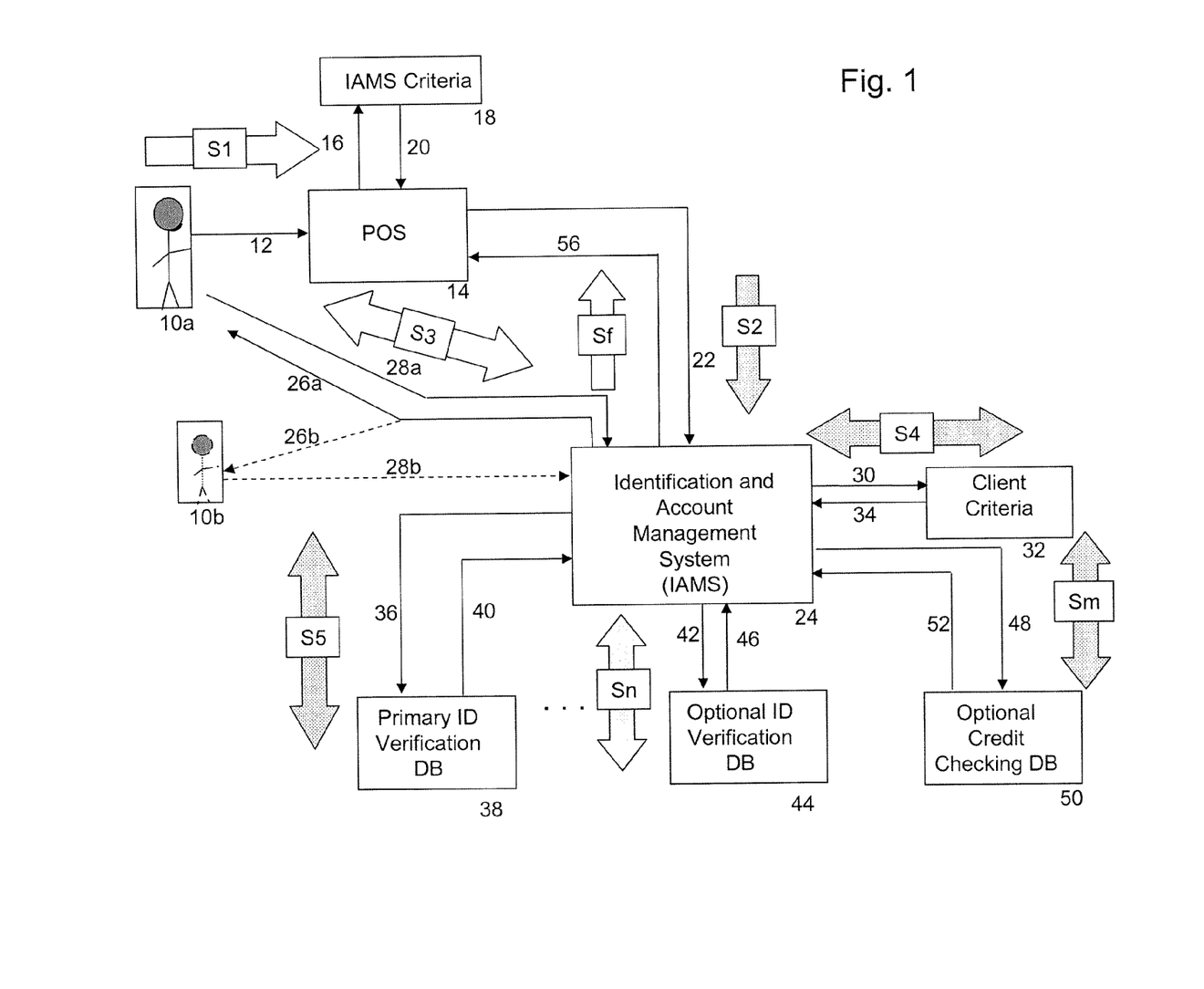
FIG. 1 is a schematic view of the present invention.

Referring to FIG. 1, an identification and account management system (hereinafter, IAMS) according to the present invention is shown along with other blocks representing other participants in the operation of the system. The flow arrows, e.g. S1, shown in FIG. 1 and other figures are intended to assist the reader to follow the flow of the information exchange between different system entities. Also, portions of FIG. 1 are described in detail in association with other figures.

In one implementation of the system, unidentified consumer 10a contacts a point of sale of a product or service, designated by POS in FIG. 1 bearing reference numeral 14. Unidentified consumer 10a contacts POS 14 via channel 12 which could be walking up to a cash register, contacting POS using a phone, or contacting POS via the internet for online shopping. Unidentified consumer 10a seeks to purchase a product or service from POS 14 by passing certain information to POS 14 as indicated by information flow arrow S1. In one example of the above implementation, unidentified consumer 10a is the initiator of a collect call and POS 14 is the telecommunication company. Information flow arrow S1 constitutes unidentified consumer 10a name and phone number, and the recipient's telephone number. POS 14, in this example, using available databases checks the recipient's telephone number. If the intended recipient's telephone number is associated with one of cellular, VOIP or other forms of non-traditional telephone lines, POS 14 makes credit-extending service, e.g. IAMS available to the intended recipient. The credit-extending service may or may not have any previous relationship with unidentified consumer 10a or the intended recipient.

In another example of the above implementation, unidentified consumer 10a is at a merchant's physical store, POS 14, and wishes to purchase a product or service. In this example, unidentified consumer 10a cannot or wishes not to produce an accepted credit card to purchase the product or service, or POS 14 accepts no credit cards. Information flow arrow S1 in this example may include the name of unidentified consumer 10a, identification of product or service sought to be purchased, and selection of an option that indicates to POS 14 a desire on the part of unidentified consumer 10a to purchase the product or service by using a credit-extending service, e.g. IAMS. The credit-extending service may or may not have any previous relationship with unidentified consumer 10a.

In yet another example of the above implementation, unidentified consumer 10a is at a virtual store shopping for a product or service online. Upon selecting the items to be purchased, unidentified consumer 10a makes the choice of charging the purchase or using a credit-extending service, e.g. IAMS to obtain credit for the purchase. The credit-extending service may or may not have any previous relationship with unidentified consumer 10a.

In another implementation, IAMS can be used with another system for identity verification and account management purposes. For example, IAMS can be used in advance to verify the identification of unidentified consumer 10a and for purchasing tickets to be picked up and redeemed at a movie theater. IAMS generates a personal identification number (PIN), and communicates the PIN to both identified consumer 10a and a companion system at the movie theater. Identified consumer 10a enters the PIN at a kiosk and receives the tickets.

Figure 2:
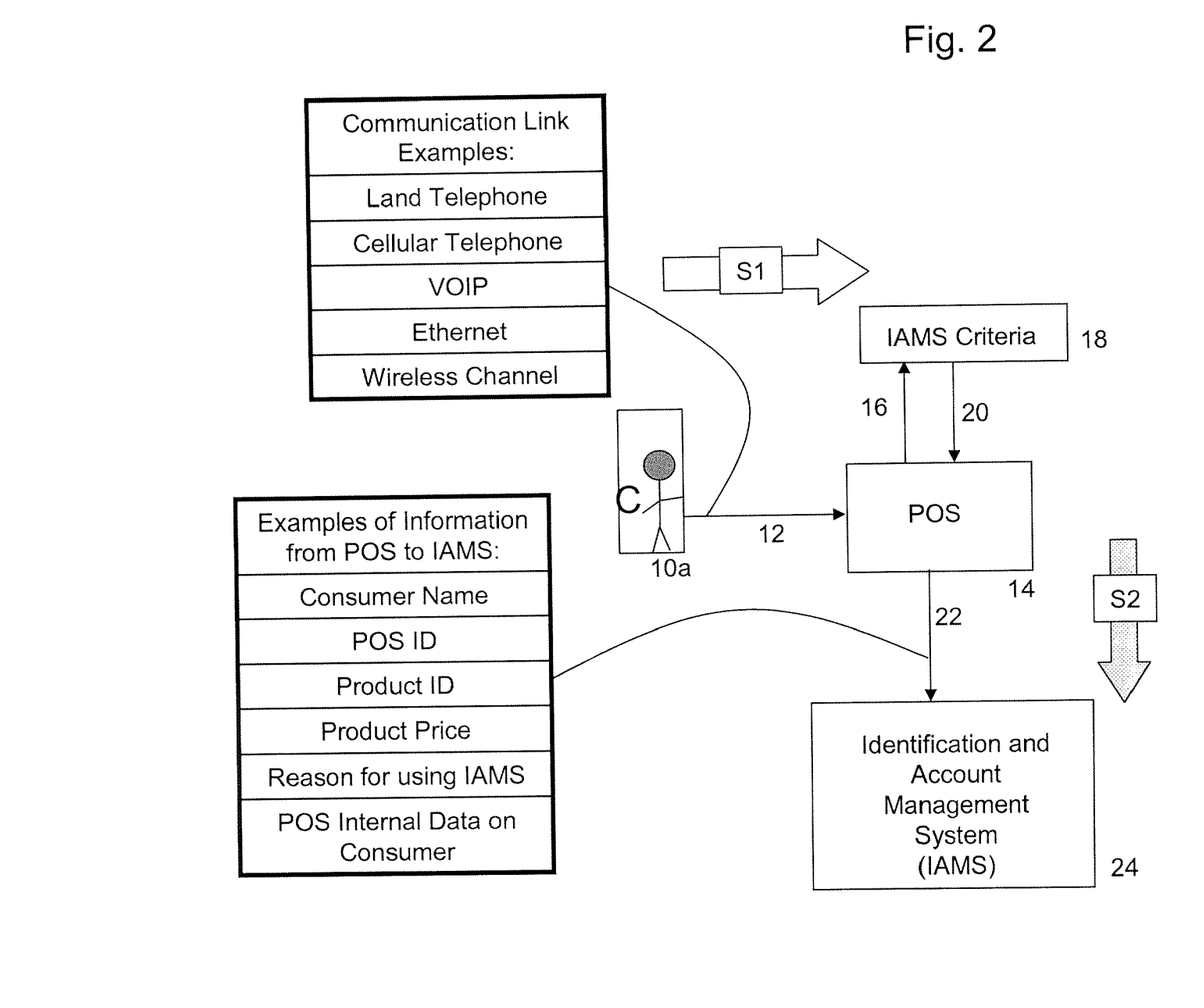
FIG. 2 is a partial schematic view of the present invention.

More detail of the interface between unidentified consumer 10a and POS 14 is shown in FIG. 2. The communication link between unidentified consumer 10a and POS 14 is shown as channel 12 which can be any combination of land telephone line, cellular telephone, VOIP, Ethernet, wireless communication, satellite communication, or any other communication channel which are known to those skilled in the art that transmits an identifier associated with the origin of the communication. Once POS 14 receives a request by unidentified consumer 10a to purchase a product or service using IAMS, POS 14 tests the information obtained from unidentified consumer 10a against its internal database. This is shown as IAMS criteria block 18. POS 14 relays product/service and consumer related information to IAMS criteria block 18 by way of IAMS criteria block input data 16 and POS 14 receives instruction by way of IAMS criteria block output data 20. If the test at IAMS criteria block 18 is affirmative, POS 14 contacts IAMS 24 by transferring information to IAMS 24 as designated by the POS-IAMS transfer 22 and by flow arrow S2. POS-IAMS transfer 22 may include name of unidentified consumer 10a, POS ID, product ID, product price, reason for using IAMS, POS internal data on unidentified consumer 10a, etc., as shown in FIG. 2.

Figure 3:
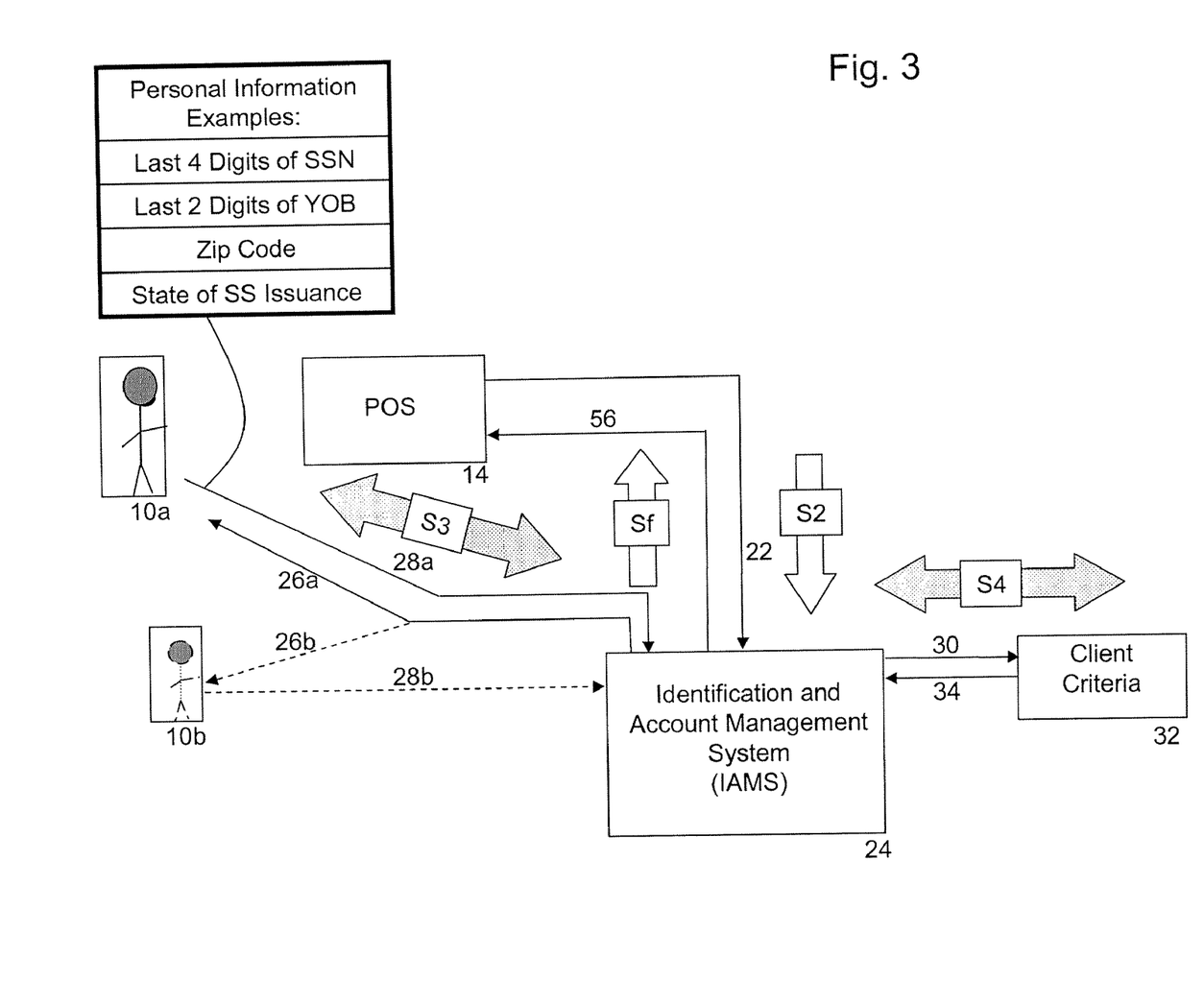
FIG. 3 is a partial schematic view of the present invention.

Referring now to FIGS. 1 and 3, IAMS 24 initiates communication with unidentified consumer 10a to obtain information. In the collect call implementation, described above, IAMS 24 contacts the intended recipient of the collect call, unidentified consumer 10b. Although in other implementations unidentified consumers 10a and 10b may be the same entity, in collect call cases or other implementations where one consumer wishes to charge another consumer with purchases of products or services, unidentified consumers 10a and 10b are different entities. Whether unidentified consumers 10a and 10b are the same entity, IAMS 24 in response to purchase request in one of the above described manners, initiates communication with unidentified consumer 10a or 10b using any one combination of the available channels, e.g. land telephone line, cellular telephone, VOIP, Ethernet, wireless communication, satellite communication, or any other communication channel which are known to those skilled in the art that transmits an identifier associated with the origin of the communication. IAMS 24 detects an identifier associated with the communication channel, e.g. land telephone line number, cellular telephone number, IP address, etc. In addition IAMS 24 requests a small amount of data (numbers or characters) from unidentified consumer 10a or 10b. This information exchange is shown with reference numerals 26a and 28a associated with unidentified consumer 10a, or 26b and 28b associated with unidentified consumer 10b. In one embodiment, the data required is no more than 11 digits, e.g. last four digits of social security number (hereinafter, SSN), last 2 digits of year of birth (hereinafter, YOB), and postal zip code. This information along with the communication identifier associated with the origin of the communication is confirmed against IAMS 24 internal database to determine whether consumer 10a or 10b is an existing client, as shown by reference numerals 30 and 34, client criteria block 32, and flow arrow S4. If the internal database of IAMS 24 indicates consumer 10a or 10b is an existing client, the client criteria block 32 determines whether IAMS 24 should contact optional identification verification databases to further verify the identity of consumer 10a or 10b. Further, client criteria block 32 determines whether IAMS 24 should contact an optional credit checking database to determine creditworthiness of identified consumer 10a or 10b.

Figure 4:
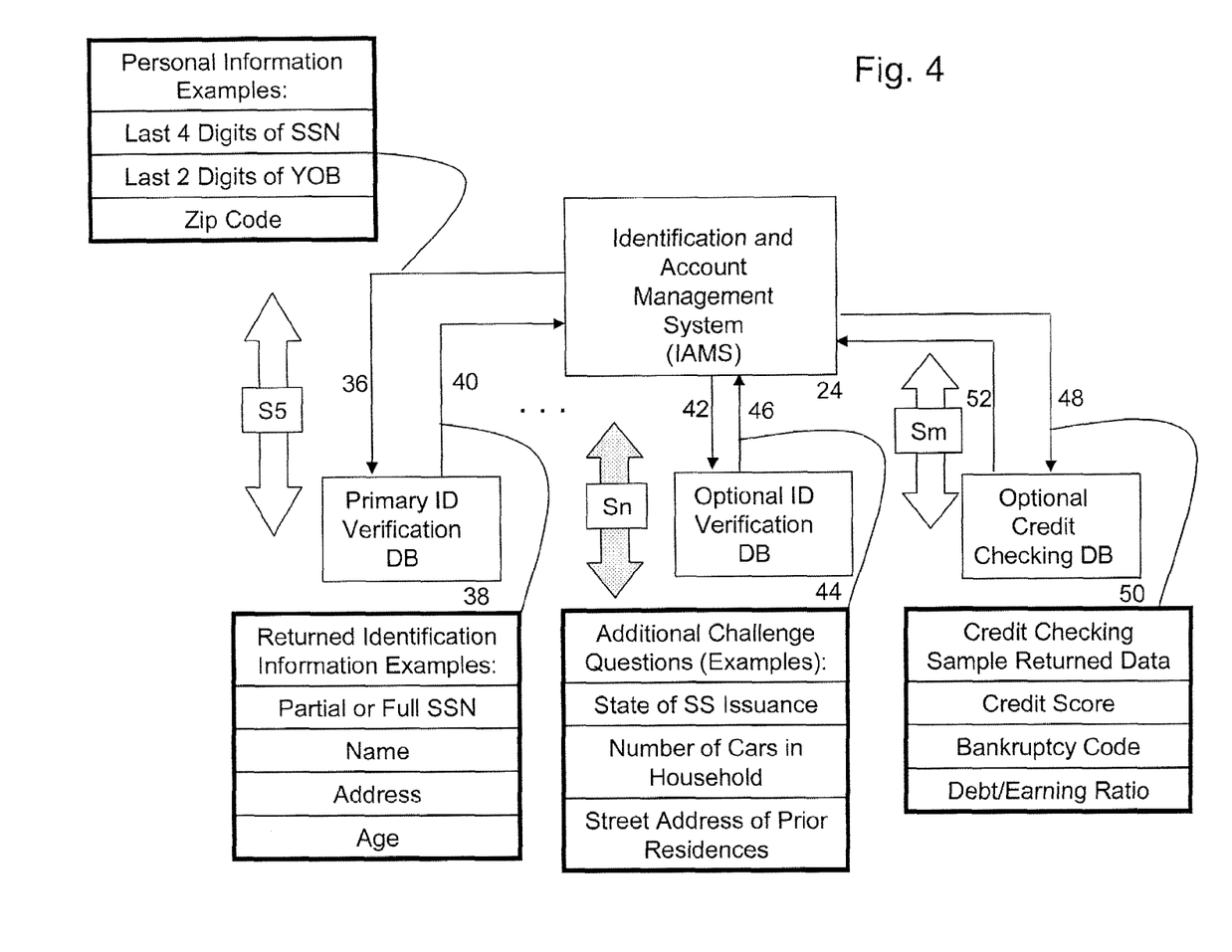
FIG. 4 is a partial schematic view of the present invention.

If internal database of IAMS 24 indicates unidentified consumer 10a or 10b is not an existing client, IAMS 24 contacts a primary identification verification database with the information obtained from unidentified consumer 10a or 10b, as shown in FIG. 4.

Referring to FIGS. 1 and 4, IAMS 24 communicates with a primary identification verification database 38, as indicated by reference numerals 36 and 40 and flow arrow S5, transferring information associated with unidentified consumer 10a or 10b, e.g. last four digits of SSN, last two digits of YOB, and postal zip code. Primary identification verification database 38 checks its internal database in order to identify unidentified consumer 10a or 10b. If a match is found, primary identification verification database 38 returns information associated with identified consumer 10a or 10b, e.g. first five digits of SSN, street address, telephone number, and an optional confidence score as the confidence that the person identified is the unidentified individual. Based on client criteria block 32, shown in FIG. 3, and the optional confidence score, IAMS 24 may decide to communicate with an optional identification verification database 44, indicated in FIG. 4 by reference numerals 42 and 46 and flow arrow Sn. Optional Identification verification database 44 can be the same as a primary identification verification database 38 or different. Additionally, as indicated in FIG. 4, IAMS 24 may contact multiple optional identification verification databases. IAMS 24 sends to optional identification verification database 44 information associated with unidentified consumer 10a or 10b, e.g. SSN, street address, telephone number. In return, optional identification verification database 44 provides challenge questions to IAMS 24 to be communicated to unidentified consumer 10a or 10b. Answers to the challenge questions are of the sorts that are only known by the rightful consumer, e.g. address of last residence, state in which consumer's social security card was issued, number of cars in consumer's household, etc. IAMS 24 presents the challenge questions to unidentified consumer 10a or 10b and communicates the supplied answers to optional identification verification database 44. The latter is accomplished by IAMS 24 initiating a new communication with unidentified consumer 10a or 10b or by continuing the initial communication. The challenge questions are provided to and the answers provided by unidentified consumer 10a or 10b are relayed to optional identification verification database 44. The latter examines the answers against its internal database and provides an optional confidence score as to the identity of consumer 10a or 10b.

Regardless of whether an optional identification verification database is used, IAMS 24, based on available data examined in client criteria block 32, may decide to contact a credit checking database, as shown in FIGS. 1 and 4 by reference numerals 48, 50, 52, and flow arrow Sm. IAMS 24 communicates identification data associated with identified consumer 10a or 10b to optional credit checking database 50. In return, a credit score is provided to IAMS 24 which is used in determining whether to extend credit to identified consumer 10a or 10b.

IAMS 24 also verifies whether identified consumer 10a or 10b wants to accept a credit for which a bill will be sent to the address supplied by primary identification verification database 38. If the answer to this question is affirmative and other conditions in client criteria block 32 have been satisfied, IAMS 24 informs POS 14 of a willingness to lend credit for the purchase of the product or service on behalf of identified consumer 10a or 10b, as indicated by reference numeral 56 and flow arrow Sf. Upon accepting the offer to extend credit by IAMS 24 on behalf of identified consumer 10a or 10b, POS 14 sells the requested product or service. Once the sale is complete, POS 14 provides a bill to IAMS 24. This bill is processed and sent to identified consumer 10a or 10b for payment with applicable service charges.

Additionally, IAMS records the communication identifier associated with the origin of the communication and associates the communication identifier with the remainder of the personal information of identified consumer 10a or 10b. The recorded communication identifier is then used in future communications with identified consumer 10a or 10b as part of the identification verification process. For example, when IAMS 24 communicates with unidentified consumer 10a or 10b and recognizes the recorded communication identifier, IAMS 24 may decide to ask additional questions based on the personal information IAMS 24 has on file in order to verify the identity.

Figure 5:
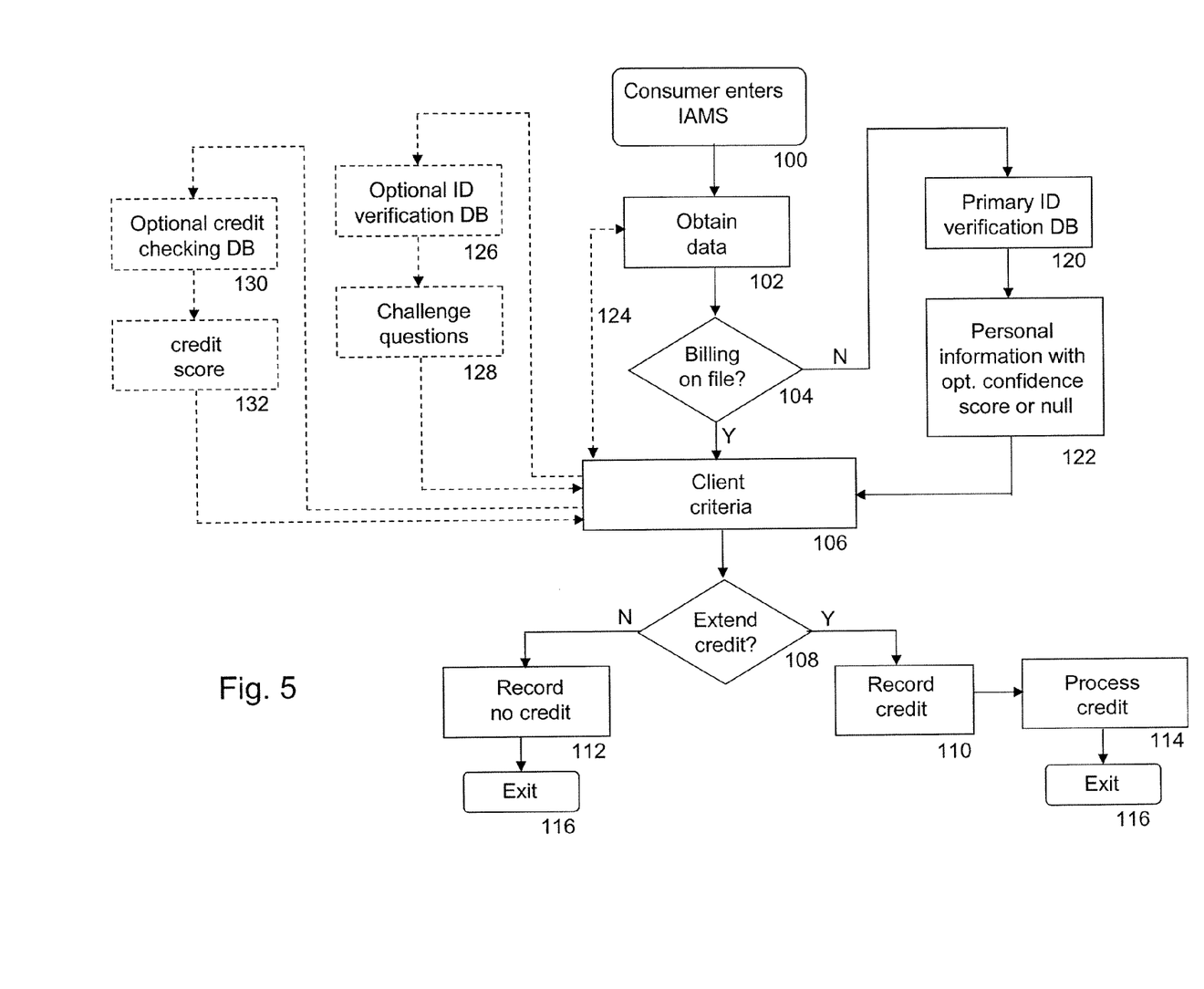
FIG. 5 is a flow chart of the present invention.

Referring to FIG. 5, a flow chart is shown to demonstrate the relationship between action and decision blocks. Block 100 shows unidentified consumer 10a or 10b entering the IAMS system by way of communicating with the system. As explained above the communication channel can be any combination of land telephone line, cellular telephone, VOIP, Ethernet, wireless communication, satellite communication or any other communication channel which are known to those skilled in the art that transmits an identifier associated with the origin of the communication. In block 102 IAMS obtains data from unidentified consumer 10a or 10b and in block 104 checks whether billing information already exists, i.e., whether unidentified consumer 10a or 10b is an existing client. If no billing information exists, IAMS contacts a primary identification verification database as shown by block 120. IAMS communicates data obtained from unidentified consumer 10a or 10b in block 102 to block 120. If a match is made with the data, a series of personal information is returned as shown in block 122 with an optional confidence score representing the confidence that the identified person is the unidentified consumer. If no match is made a flag indicating no match is communicated to IAMS or instead no response is communicated which again indicates there were no matches. Based on the information available to IAMS, at block 106 followed by decision block 108, IAMS may decide to not extend credit, block 112, followed by exiting IAMS, block 116. Alternatively, IAMS may decide to extend credit on behalf of identified consumer 10a or 10b to a third party and thereby record the credit for billing purposes, block 110, process the credit, block 114, and exit IAMS, block 116.

As explained above, IAMS records the communication identifier associated with the origin of the communication and associates the communication identifier with the remainder of the personal information of identified consumer 10a or 10b. The recorded communication identifier is then used in future communications with identified consumer 10a or 10b as part of the identification verification process in the manner described above.

When determining whether to extend credit, at block 106, IAMS may want to obtain additional data in order to build a higher confidence level for extending credit. This is done by contacting additional optional databases, blocks 126 and 130. There may be several reasons for contacting these databases. For example, the optional confidence score communicated from the primary identification verification database, block 122, may indicated a low score. In one example, if the optional confidence score from the primary identification verification database is below 80 from a scale of 100, IAMS considers that to be too low and thereby initiates contact with optional databases. The reason for a low confidence score may be because multiple persons were identified by the primary identification verification database matching all or part of the information it was supplied by IAMS. Another reason for contacting the optional databases is if the internal client criteria testing, block 106, determines a low confidence score in the available data. This may occur if, for example, one of the many fields of personal information returned from the primary identification verification database, block 122, fails to match the same field in the internal database of IAMS. Another example is if the client had delayed paying a previous bill, prompting IAMS to produce a low creditworthiness score. In this case, IAMS may decide to contact an optional database to obtain the most recent credit score for identified consumer 10a or 10b. In any of these cases, optional credit checking database, block 130, returns a credit score, block 132.

A first type of optional database IAMS may want to communicate with is another identification verification database, block 126. IAMS communicates personal data which IAMS knows about unidentified consumer 10a or 10b. In return challenge questions are provided to IAMS, block 128, based on data the optional identification verification database has on unidentified consumer 10a or 10b. IAMS communicates these challenge questions to unidentified consumer 10a or 10b, as indicated by arrow 124, and the answers are checked for accuracy.

A second type of optional database IAMS may want to communicate with is a credit checking service. IAMS communicates personal information of identified consumer 10a or 10b to an optional credit checking database, block 130, and in return a credit score indicating creditworthiness of identified consumer 10a or 10b is returned to IAMS. As already mentioned, IAMS uses all of the above described data to decide whether to extend credit on behalf of identified consumer 10a or 10b to a third party.

In other applications, the present invention may also be used to verify the identity of unidentified consumer 10a. For example, POS 14 verifies information about unidentified consumer 10a prior to entering that information in its internal database as a new entry. An example of this implementation is identity verification of a new perspective employee by an employer. This scheme allows POS 14 to retain and maintain full sets of identifiers consisting of, e.g. name, SSN, address, phone number, etc. Alternatively, POS 14 can minimize the amount of information it needs to assuredly identify unidentified consumer 10a on a return visit. In other words, once the identity has been verified on an initial visit, POS 14 assigns a unique identifier to identified consumer 10a based on minimal amount of information, e.g. name. Each time identified consumer 10a returns, POS 14 either accesses its large-data internal database or contacts IAMS to verify the identity.

In yet another application, IAMS can be used to quickly verify identity and age of unidentified consumer 10a who wishes to purchase age-restricted products or services, and for cases where unidentified consumer 10a wishes to enter age-restricted establishments. For example, POS 14 can use IAMS to check the identify and age when unidentified consumer 10a wants to purchase alcoholic beverages, tobacco products, products with adult content, enter a night club, view an age-restricted rated movie at a movie theater, and rent an age-restricted movie at a movie rental facility.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for managing an account for an individual comprising the steps of:
   communicating with an individual who is seeking to purchase a product or service from a point of sale without disclosing an account number to the point of sale;
   obtaining from said individual personal information consisting of the last four digits of the social security number of the individual, the last two digits of the year of birth of the individual, and the five digit postal zip code of the residence of the individual;
   using an account management system to compare said obtained personal information to at least one database including a plurality of personal information associated with a plurality of individuals;
   identifying from the plurality of individuals one identified individual whose plurality of personal information includes the personal information associated with said individual; and
   managing an account for said individual in an account database.

2. The method of claim 1 wherein the step of managing an account includes extending credit to a third party on behalf of the identified individual.

3. The method of claim 1 wherein the step of managing an account includes at least one of creating a new account for the identified individual and updating the account where the plurality of personal information of the identified individual exists in the account database.

4. The method of claim 1 wherein the step of managing an account includes communicating with a credit checking service, obtaining a credit score, and analyzing the credit score with the plurality of personal information to determine whether to extend credit to a third party on behalf of the identified individual.

5. The method of claim 1 wherein the step of communicating with an unidentified individual includes the use of at least one of a telephone land line, cellular telephone, VOIP, Ethernet, wireless, and satellite.

6. The method of claim 1 further comprises the step of comparing answers to a plurality of challenge questions associated to the plurality of personal information to verify identity of the unidentified individual.

7. The method of claim 6 wherein said obtained personal information is compared to another database which includes at least one of the individual's residence land telephone number, work land telephone number, residence address, work address, a portion of the social security number, the complete social security number, state in which the social security number was issued, number of vehicles in the household, number of vehicles in the neighbors' households, a range of income in the household, and the street address of the previous residence.

8. The method of claim 1 further comprises the step of assigning a confidence score to the individual and using the confidence score to indicate the level of confidence that the individual has been correctly identified.

9. The method of claim 8 wherein the step of communicating with an unidentified individual includes the use of telephone land line, cellular telephone, VOIP, Ethernet, wireless and satellite.

10. A method for managing an account for an unidentified individual comprising the steps of:
   receiving a communication from an unidentified individual who is using a device to communicate which transmits an identifier associated with the origin of the communication;
   requesting the unidentified individual to communicate a group of numbers which includes no more than 11 digits consisting of the last four digits of the social security number associated with the unidentified individual, the last two digits of the year of birth associated with the unidentified individual, and the postal zip code associated with the unidentified individual;

comparing the group of numbers to at least one database including a plurality of personal information associated with a plurality of individuals;

identifying from the plurality of individuals one identified individual whose plurality of personal information includes the group of numbers associated with the unidentified individual, and managing an account for the identified individual in an account database.

11. The method of claim 10 wherein the step of managing an account includes extending credit to a third party on behalf of the identified individual.

12. The method of claim 10 wherein the step of managing an account includes at least use of creating a new account for the identified individual wherein at least one component of the plurality of personal information is new and updating the account wherein the plurality of personal information of the identified individual exists in the account database.

13. The method of claim 10 further comprises the steps of communicating with a credit checking service, obtaining a credit score, and analyzing the credit score with the plurality of personal information to choose whether to extend credit to a third party on behalf of the identified individual.

14. The method of claim 10 wherein the step of identifying the one identified individual corresponding the group of numbers to the plurality of personal information and corresponding answers to a plurality of challenge questions to the plurality of personal information.

15. The method of claim 14 wherein the at least one group of characters is compared to another database which includes at least one of the individual's residence land telephone number, work land telephone number, residence address, work address, a portion of the social security number, the complete social security number, state in which the social security number was issued, number of vehicles in the household, number of vehicles in the neighbors' households, a range of income in the household, and the street address of the previous residence.

16. The method of claim 10 further comprises the steps of assigning a confidence score to the identified individual based upon the unidentified individual's personal information to indicate the level of confidence that the identified individual is in fact the unidentified individual and using the confidence score to determine whether to communicate to at least one more database to verify the identity of the unidentified individual.

* * * * *